United States Patent [19]
Silverbrook

[11] Patent Number: 5,428,464
[45] Date of Patent: Jun. 27, 1995

[54] HIGH VOLUME COLOR IMAGE PRINTER SYSTEM

[75] Inventor: Kia Silverbrook, Wollahra, Australia

[73] Assignees: Canon Kabushiki Kaisha, Tokyo, Japan; Canon Information Systems Research Australia Pty. Ltd., New South Wale, Australia

[21] Appl. No.: 233,727

[22] Filed: Apr. 26, 1994

Related U.S. Application Data

[63] Continuation of Ser. No. 725,636, Jul. 3, 1991, abandoned.

[30] Foreign Application Priority Data

Jul. 5, 1990 [AU] Australia ............................ PK1024

[51] Int. Cl.[6] ........................ H04N 1/23; H04N 1/50
[52] U.S. Cl. .................................. 358/501; 395/109
[58] Field of Search ................... 358/501, 300, 409; 346/157; 395/109

[56] References Cited

U.S. PATENT DOCUMENTS 4,660,077 4/1987 Kwamura et al. ................. 358/501
4,791,492 12/1988 Nagashima et al. ................. 358/409
5,040,031 8/1991 Hayashi ............................... 358/300
5,091,734 2/1992 Suzuki et al. .
5,099,260 3/1992 Sato et al. ............................ 346/157

Primary Examiner—Scott A. Rogers
Attorney, Agent, or Firm—Fitzpatrick, Cella, Harper & Scinto

[57] ABSTRACT

A parallel printing system is disclosed which is particularly useful for colour laser printing. The system includes a source of video image data generally derived from a scanner or a graphics system, and a plurality of print engines that, substantially simultaneously, print images output from the source. The printing system also includes a parallel printing desynchroniser that interfaces the source with each one of the print engines and permits asynchronous operation of each of the print engines by having various data stores, a first of which receives synchronous data from the source, and a plurality of other stores, corresponding to each engine, which receive data from the first store simultaneously, and output that data in synchronism with the respective print engine.

17 Claims, 13 Drawing Sheets

HIGH VOLUME COLOR IMAGE PRINTER SYSTEM

This application is a continuation of application Ser. No. 07/725,636 filed Jul. 3, 1991, abandoned.

BACKGROUND OF THE INVENTION

1. Field of the Invention

The present invention relates to laser printing and, in particular, discloses a high volume colour laser printing system.

2. Description of the Prior Art

Colour laser copiers and printing systems are known in the art with one well known example being the CANON (Registered Trade Mark) Colour Laser Copier from Canon KK of Japan.

Such copiers and corresponding printers have the potential to become standard engines for colour desktop publishing as well as for many other areas of printed image generation. However, there are several problems which should be overcome in order to fully realise the potential of such equipment.

Specifically, one of these problems is printer speed. Colour laser copiers currently in use have a print speed of five A4 pages per minute (PPM) or three A3 PPM. Such speeds limit the practicality of producing large print runs on the copier. Generally, off-set printing is used for volumes in excess of about 100 pages, however off-set printing involves attendant setup costs and delays.

Turning now to FIG. 1, a prior art colour laser copier is shown in schematic block diagram. A scanner 1 is provided to scan the document to be reproduced and outputs scanned digital data via a bus 3 to a digital signal processing unit 2. This unit 2 outputs to a digital to analogue converter (DAC) and pulse width modulator (PWM) 4 via a bus 5. The busses 3 and 5 carry the video data in its component colours as red, green and blue (RGB) and magenta, cyan, yellow, and black (MCYK) respectively. Generally, in the former 24 bits in parallel are used and in the latter 4×8 serial bits of information are used.

The unit 4 supplies a laser scanner 6 which sensitises the drum (not illustrated) of an electrophotographic unit in known fashion.

The system used by the Canon laser copier utilises four component colours M, C, Y, and K and uses a 13.35 MBytes per second data rate. A control microprocessor 8 is provided to provide overall process control of the copier.

The copier of FIG. 1 can be readily divided into two parts comprising an source unit 10 and a colour laser printer (CLP) engine 20. A block diagram representation of such a system is shown in FIG. 2 where the image source 10 and the CLP engine 20 are clearly shown as individual devices connected by a number of electrical connections. The CLP engine 20 accordingly represents the printing part of the colour laser copier and such an engine, when divided from a Canon laser copier accepts 8 bit MCYK video data running at 13.35 MBytes per second. The source unit 10 can be a scanner as in the scanner of FIG. 1, or can also be a computer graphic system, such as that disclosed in Australian Patent Application Nos. PK1785 and PK3418 to the present Applicant, from which images can be produced electronically and printed using the CLP engine 20. The source unit 10 includes an image source 11 which outputs data to a line first-in-first-out (FIFO) shift register 12 which is able to hold one line of data for printing in the CLP engine 20. Generally, this line is 4632 bytes and in practice a 5K byte FIFO 12 is used. The source unit 10 also includes a balanced transmitter 13 which outputs data from the line FIFO 12 to the CLP engine 20. A synchronisation unit 6 is provided to synchronise the transfer of data from the source unit 10 to the CLP 20. An RS232 unit 15 is provided also for the communication of control signals between the unit 10 and the engine 20.

The CLP engine 20 includes a balanced receiver 14 for receiving colour component video data from the source unit 10. The received data is stored in a line FIFO register 21 which in turn outputs to a signal conditioner and pulse width modulator 4 in a manner similar to that of FIG. 1. The conditioner and modulator 4 in turn outputs to the laser beam printer 7. An RS232 communication port 16 is also provided to receive command data from the source unit 10.

Accordingly, the CLP engine 20 represents that portion of a colour laser printer stripped of all functions not necessary for actually printing the duplicate document. Accordingly, such an engine does not require a frame store, a computer except a microcontroller, a scanner, complicated graphic software such as a Postscript and other such equipment and features which are utilised in a complete laser colour copier.

Accordingly, the cost of such an engine is substantially reduced when compared to the cost of laser copier. It is envisaged that the engine can retail for about US$5,000 in 1993.

High volume printing can be achieved in a number of ways and one method is by printing at a higher speed which involves the construction of a faster printer. However, in order to obtain an n-fold increase in print speed, all component parts of the printer are required to operate n-times faster. Such a printer is shown in block diagram form in FIG. 3. FIG. 3 shows a high speed system which includes a high speed scanner 30 which outputs MCYK data via a bus 31 to a high speed printer 32. An optional graphics system 33 can also be provided to convert RGB data from the scanner 30 into MCYK data for the printer 32.

It is apparent to those skilled in the art that in such a system, every component must operate at a proportionally faster rate. For example, to obtain a 10-fold improvement in printing speed, the following is required:

The MCYK data rate must increased to 133.5 MBytes per second;

The digital signal processing in the print engine must be made to work ten times faster;

The drum(s) must rotate ten times faster;

The paper transport mechanism(s) must operate ten times faster;

The laser switching speed must be increased by a factor of ten;

The laser power must be increased so as to charge the selenium drum (used in the Canon laser copier) to the same level;

The polygon mirror must rotate ten times faster, whilst maintaining the same level of accuracy;

The toner fixing process must operate ten times faster;

The toner transport mechanism must operate ten times faster;

A scanner capable of operating at a speed ten times faster must be built; and

All the computer graphics equipment which connects to and drives the printer must also operate ten times faster.

Those skilled in the art will appreciate that the combined set of problems outlined above is most severe. Also, a substantial development effort would be required to obtain even a modest speed improvement, and accordingly, such an option is not readily available. Unit costs are envisaged as being in excess of US$60,000.

Existing colour laser print engines, such as that used in the Canon colour laser copier, use a four stage print process in which each sheet of paper undergoes one pass around the print drum for each of the magenta, cyan, yellow and black print stages. It is therefore possible to make a printer which operates approximately four times faster by including separate print drums for each colour. Therefore, while the first page is being printed with black, the second is printed with yellow, the third with cyan and the fourth with magenta. Such a printer is shown in block diagram form in FIG. 4. In such a printer, the time taken to print one page is not reduced but however, the total page throughput is increased by a factor of four where multiple copies are required. With reference to FIG. 4, a parallel output scanner outputs MCYK data on each of four corresponding busses 41. The busses 41 supply a four drum printer 42 with each drum adapted for printing the specific colour required. As in the system of FIG. 3, an optional graphic system 44 can be provided to convert RGB data into MCYK data.

The development of a printer such as that shown in FIG. 4, includes the following:

Parallel MCYK data ports must be added;

Four digital signal processing units within the print engine must be included;

Four lasers, polygon mirrors, selenium drums, tone units, developer units and paper transport mechanisms must be included;

Large FIFO's must be included to accommodate for the difference between the start times of the MCYK printing frames caused by mechanical tolerances within the print mechanisms;

The paper transport mechanism must be redesigned to pass the paper from one drum to the next;

A scanner with parallel MCYK outputs must be built; and

All computer graphics equipment which connects to the printer must have parallel MCYK data outputs.

Those skilled in the art will realise that, like FIG. 3, substantial development effort is required to implement the system of FIG. 4. Whilst the development is relatively straight forward, integration of known technology into such a device is not trivial. Also, in view of the extended capacity of the printer of FIG. 4, individual item cost would be substantial. Unit costs are envisaged as being about US$40,000.

The foregoing discussion identifies a number of ways by which high volume printing can be achieved. However, each of these ways involve either substantial cost, or, substantial redevelopment of existing technology.

SUMMARY OF THE INVENTION

Accordingly, it is an object of the present invention to substantially overcome, or ameliorate, some of the abovementioned problems through provision of a high volume colour laser printing system which maximizes utilization of existing technology and is relatively inexpensive.

In accordance with one aspect of the present invention there is disclosed a printing system comprising a source of video image data, a plurality of print engines and a parallel printing desynchroniser unit interconnecting said source and said engines to allow for the transfer of said data between said source and each said engine without substantial synchronisation between the operation of any of said engines. Preferably, the system is adapted to print colour images in which the source provides colour data and the engines are colour laser print engines.

In accordance with another aspect of the present invention there is disclosed a parallel printing 0 desynchroniser unit comprising a preliminary store to synchronously receive video image data from a video data source, a plurality of first-in-first-out secondary stores each corresponding to a corresponding one of a like plurality of print engines connectable to said unit, said video data being synchronously simultaneously transferred to each of said secondary stores, each said secondary store having a trigger input and a data output both connected to the corresponding engine and arranged to transfer said data to said engine on receipt by said secondary store of a trigger signal from the corresponding engine. Preferably associated with each of the secondary stores is a corresponding one of a plurality of colour correctors to ensure consistent colour output between all the engines.

Further objects, features and advantages of the present invention will become apparent from the following detailed description of embodiments of the present invention with reference to the accompanying drawings.

DESCRIPTION OF THE PREFERRED EMBODIMENT

Essentially, the embodiments to be described use parallel printing in which fast printing is achieved by using multiple low cost print engines to provide a print speed increase proportional to the number of print units, with a low total system cost. The embodiments also are specifically directed to colour printing however, those skilled in the art will realise such technology is readily applicable to full tone black and white printing. While the time taken to print one page is not reduced by this method, the total page throughput is increased in proportion to the number of CLP engines used, where multiple copies of the same image is required.

Figure 1:
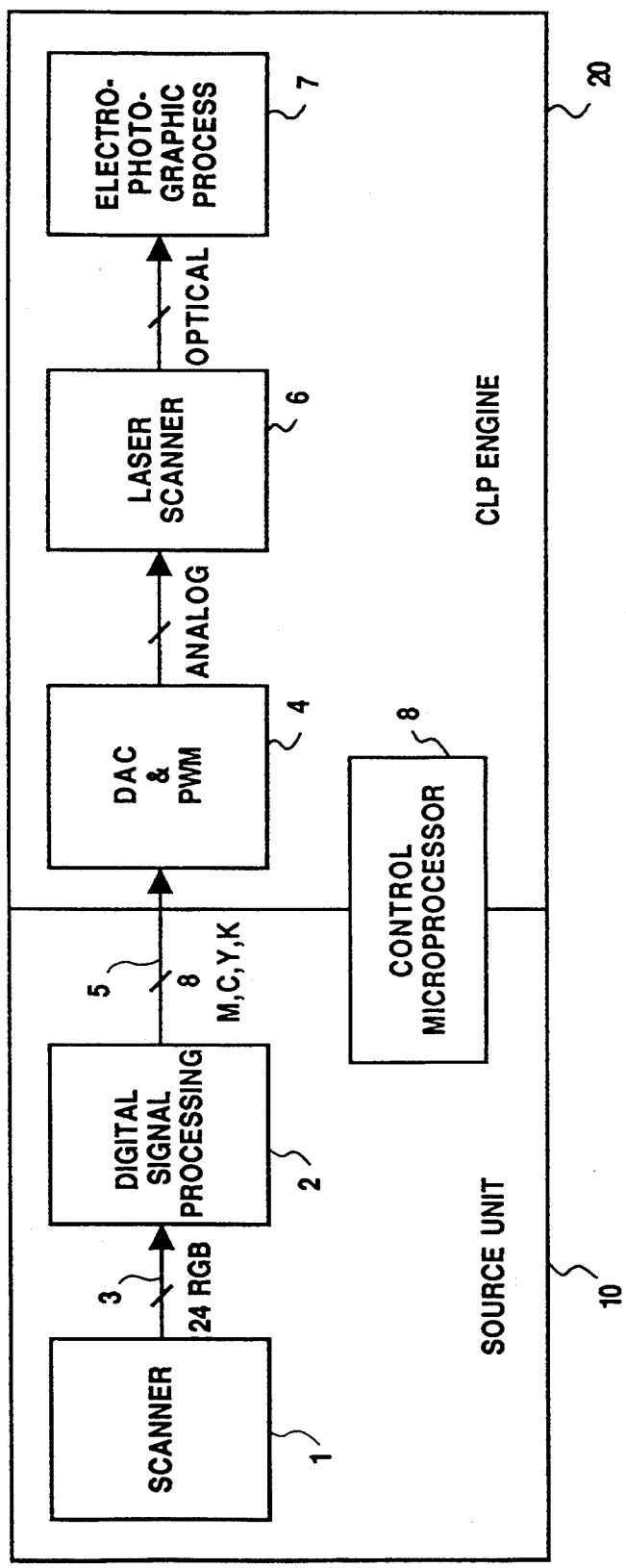
FIG. 1 is a schematic block diagram of a prior art laser colour copier.
Figure 2:
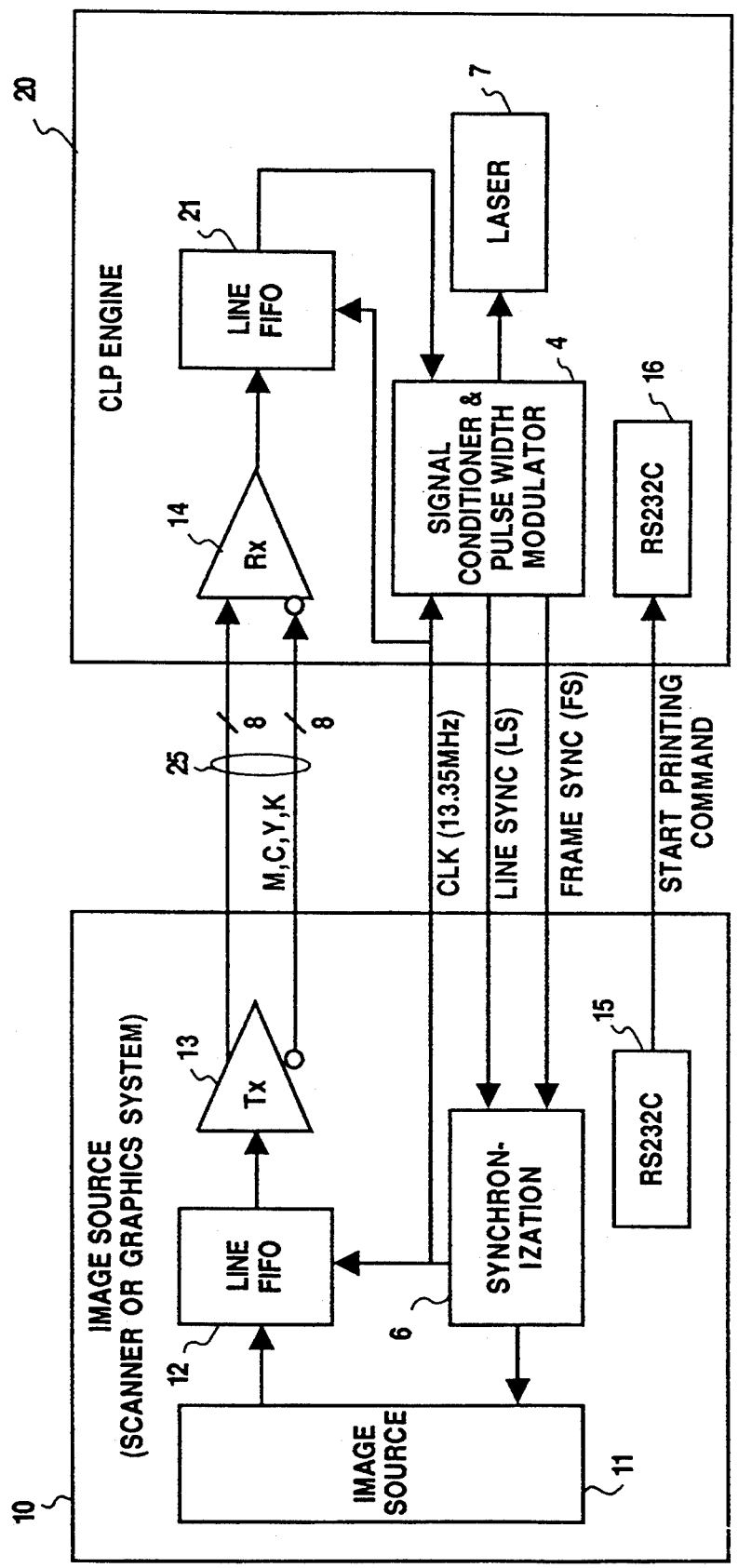
FIG. 2 is a block diagram representation of such a copier represented as a source unit and a colour laser printer.
Figure 3:
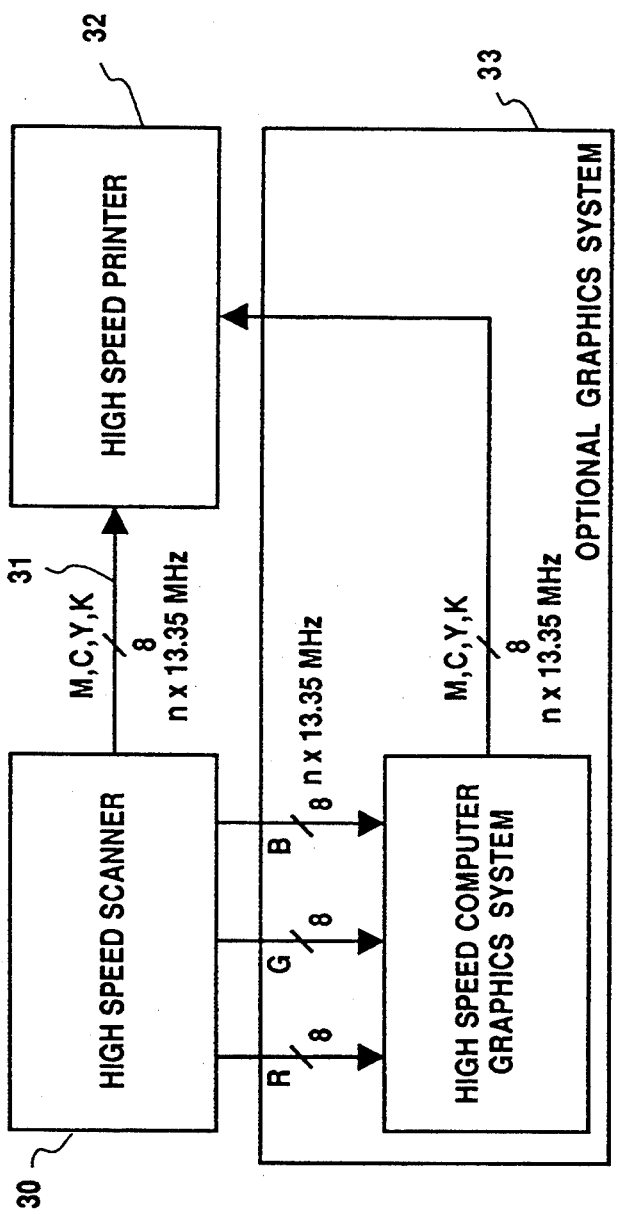
FIG. 3 is a block diagram of a first envisaged form of high speed colour laser printer.
Figure 4:
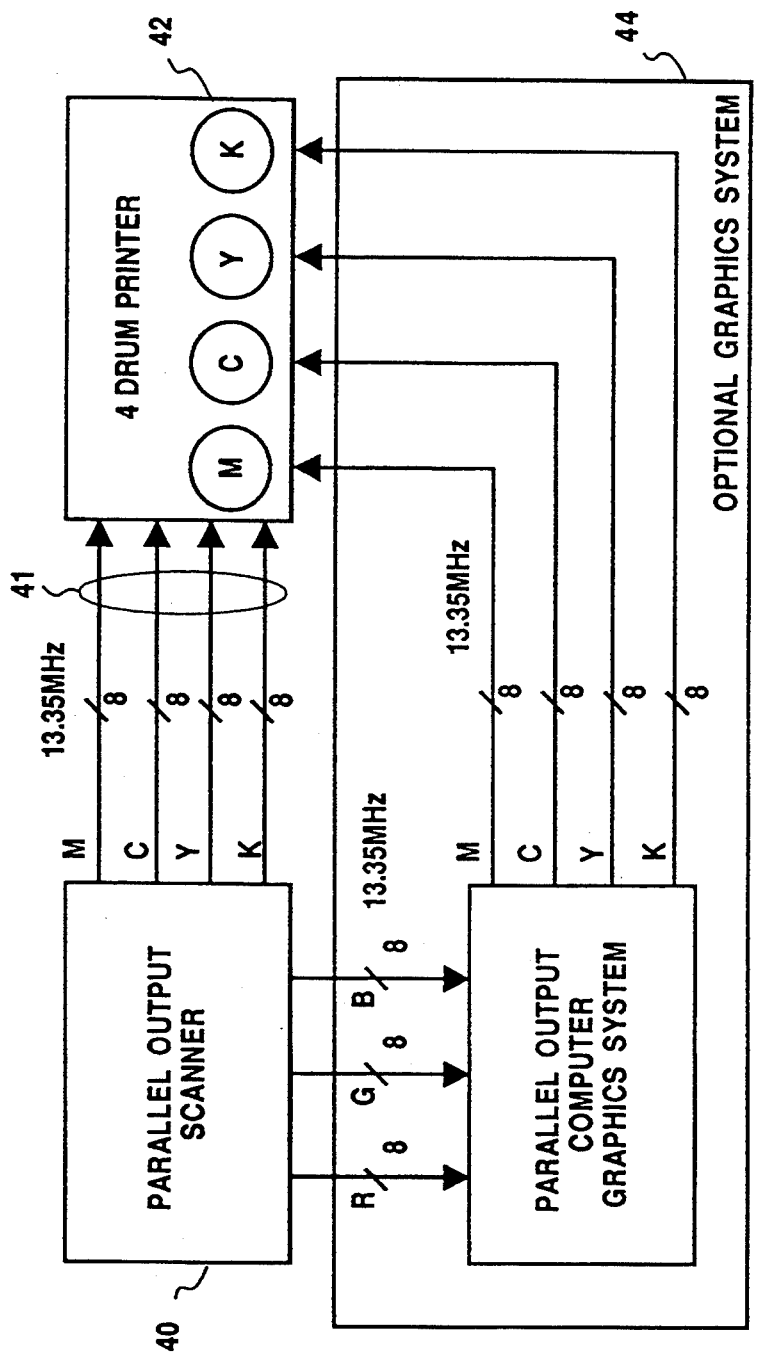
FIG. 4 is a block diagram of a second envisaged form of high speed colour laser printer.
Figure 5:
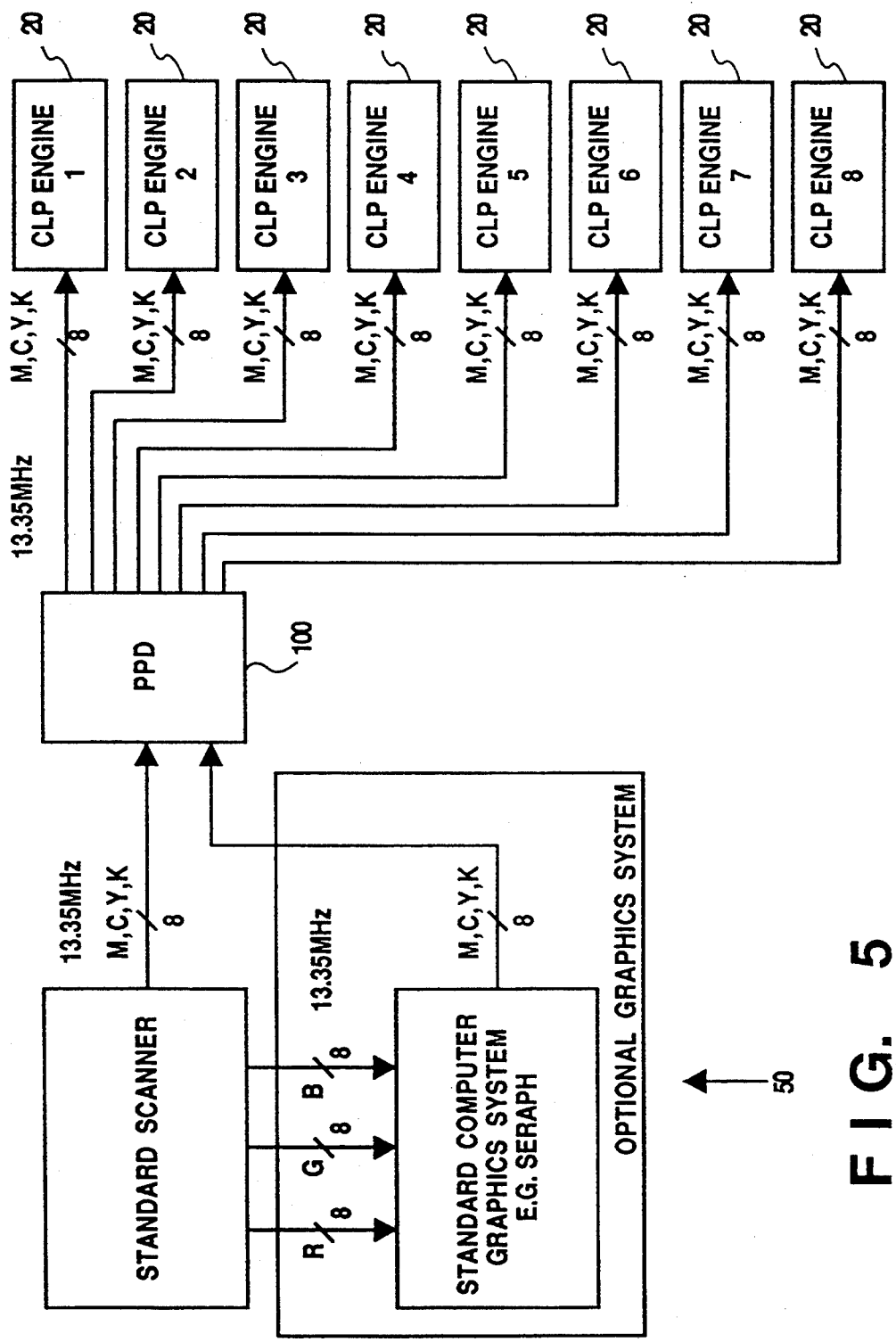
FIG. 5 shows one embodiment of the parallel printing system.

A block diagram of the preferred parallel printer system is seen in FIG. 5, this embodiment utilizing the eight CLP engines 20 as seen in FIG. 2 and a source 50 combining the source unit 10 of FIG. 2 with a graphics system such as that disclosed in Australian Patent Applications PK1785 and PK3418.

This system includes a new hardware device, a Parallel Printing De-synchroniser (PPD) 100. The PPD 100 is necessary because it is not possible to accurately synchronise commencement of actual printing of each of the CLP engines 20 due to mechanical tolerances, yet each CLP 20 receives the same high volume of continuous data, at 13.35 MBytes per second. Instead of attempting to synchronise the print commencement of each of the CLP engines 20, the PPD 100 generates a new data stream for each CLP engine 20 which is accurately synchronised to that engine, but asynchronous relative to the other engines.

The PPD 100 allows as many printers as desired to be connected together. No new print engine development is required. The PPD 100 is designed to preferably address the following problems:

To compensate for differences in print commencement time between each CLP engine;

To compensate for colour variations amongst the CLP engines; and

To control all of the CLP engines simultaneously. Unlike the earlier described high speed systems, the development effort required for this system is very small.

The CLP engine 20 prints a colour image in four colour passes; Magenta, Cyan, Yellow, and Black. Each of these colour passes prints an "analog" picture by pulse-width modulation of a laser beam. The analog image is controlled by an 8 bit digital data stream which represents 256 levels of colour intensity. The data for the CLP engine represents 500 dpi (dots per inch) for an A3 page. The page is organised as approximately 6,480 lines of 4,632 pixels each, with each pixel being 8 bits each of MCYK. This requires just under 32 MBytes of data for each colour component, for a total of 128 MBytes. This high data requirement makes it very expensive to include an image memory in the printer using current technology. Instead, the image data is passed to each of the CLP engines 20 at a predetermined rate.

Figure 6:
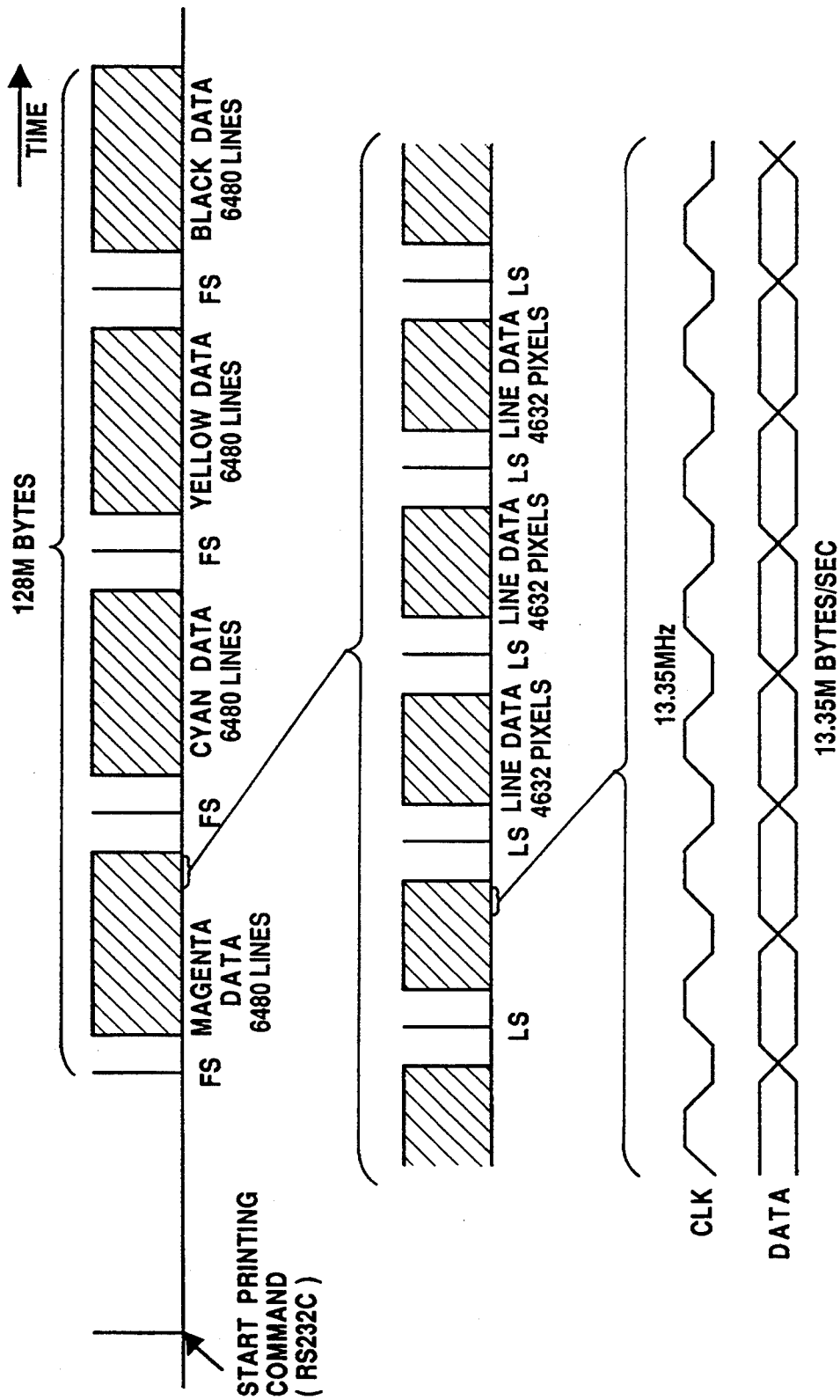
FIG. 6 shows the CLP engine data sequence.

Again, with reference to FIG. 2, because the data rate required by the CLP engine 20 is 13.35 MBytes per second, (so as to utilize existing technology), the CLP engine 20 requires that image data be passed to it while the image is being printed. It also requires to be controlled by a Frame Sync (FS) and Line Sync (LS) pulse from the CLP engine, and a pixel clock (Clk) from the scanner or graphics system. For an A3 image, 32 MBytes of each of MCYK are sent in the manner shown in FIG. 6. Furthermore, the CLP engine 20 requires that the image data used to control the pulse width modulation of the laser beam be synchronous to the rotation of the polygon mirror and the page drum of the printer. Data is made synchronous to the polygon mirror by the use of a line FIFO 21 included in the CLP engine 20, but the CLP engine 20 contains no internal method of page synchronisation. This is usually achieved by an external graphics system or scanner 50 starting the transmission of data upon demand by the CLP engine.

The use of multiple print engines 20 present a problem in that the Frame Sync pulses will arrive at different times for each print engine connected. This is due to mechanical variations in paper feed and paper transport time, drum start-up time, and response time of the printer to the RS232C "start printing" command.

Figure 7:
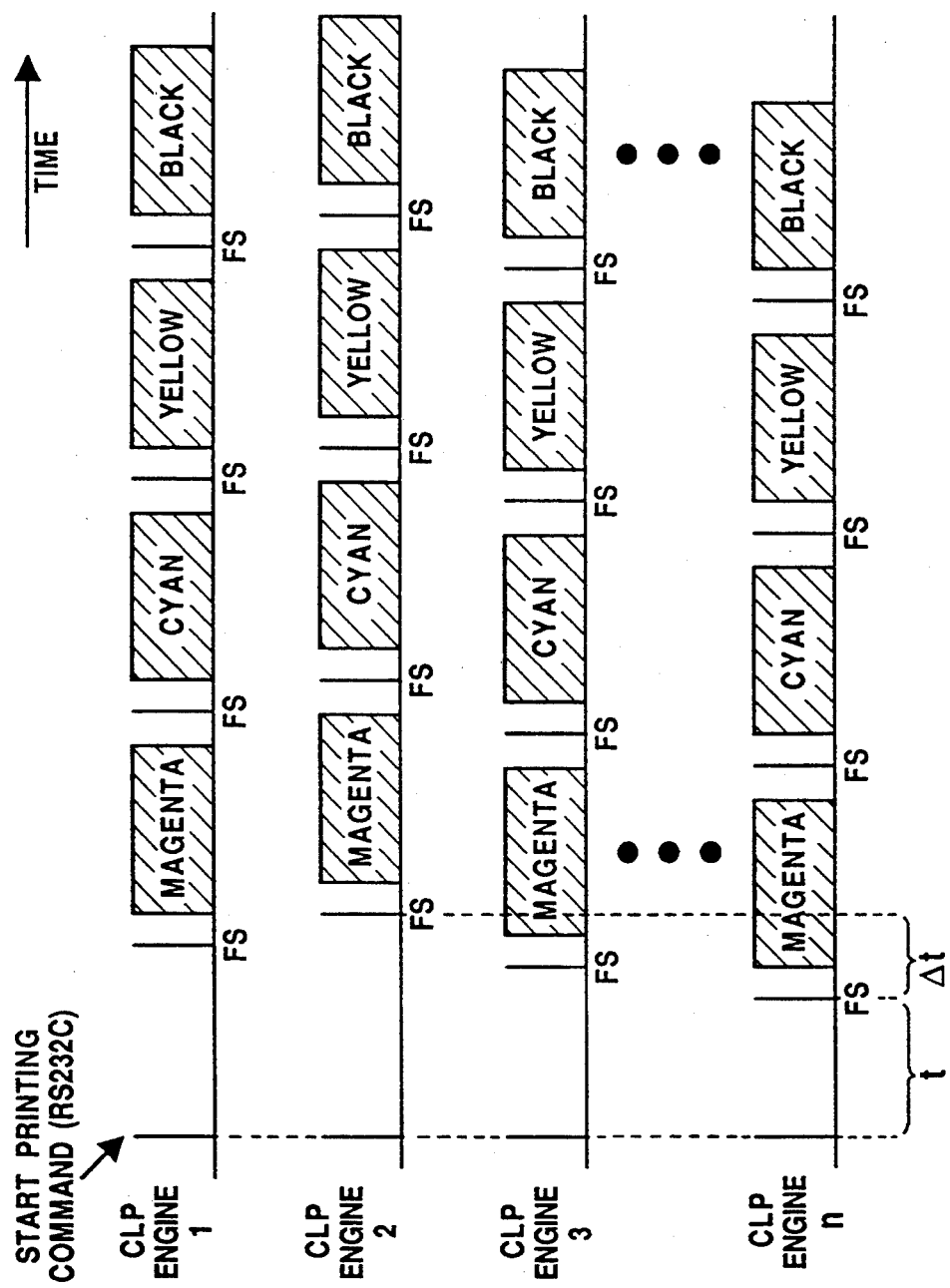
FIG. 7 shows the unsynchronous relationship between various CLP engines.

In FIG. 7, the time between the start printing command and the FS pulse is labelled t. The difference between the minimum and the maximum t is labelled $\Delta t$ and arises because of phase differences between the drums which are rotating at essentially the same speed.

The length of the FIFO 21 must be a minimum of 13.35 $\Delta t$ MBytes. If $\Delta t$ is less than 149 mS, then 2 MBytes will suffice. Up to 4 MBytes (almost 300 mS) can be cost effectively accommodated using this method.

The most cost effective current method of implementing a 2 MByte FIFO 21 is by using DRAM. Four 1 MBit $\times$ 4 DRAMs are chosen for the implementation described herein.

FIFO's cannot deliver data before they receive it. It is therefore necessary to ensure that in all of the FIFO delays are positive. This is easily achieved by ensuring that the first frame sync from the CLP engines 20 is the one sent to the scanner or graphics system 50. Using this method, the FIFO length of this CLP engine is zero.

The length of all of the FIFOs will be equal to the number of clock cycles between the FS of the first CLP engine, and the FS of the CLP engine that is connected to the PPD channel.

Each CLP engine 20 has an RS232C port, as seen in FIG. 2, that is used to send the CLP engine commands, and to receive error messages, such as "out of toner" or "paper jam".

Figure 8:
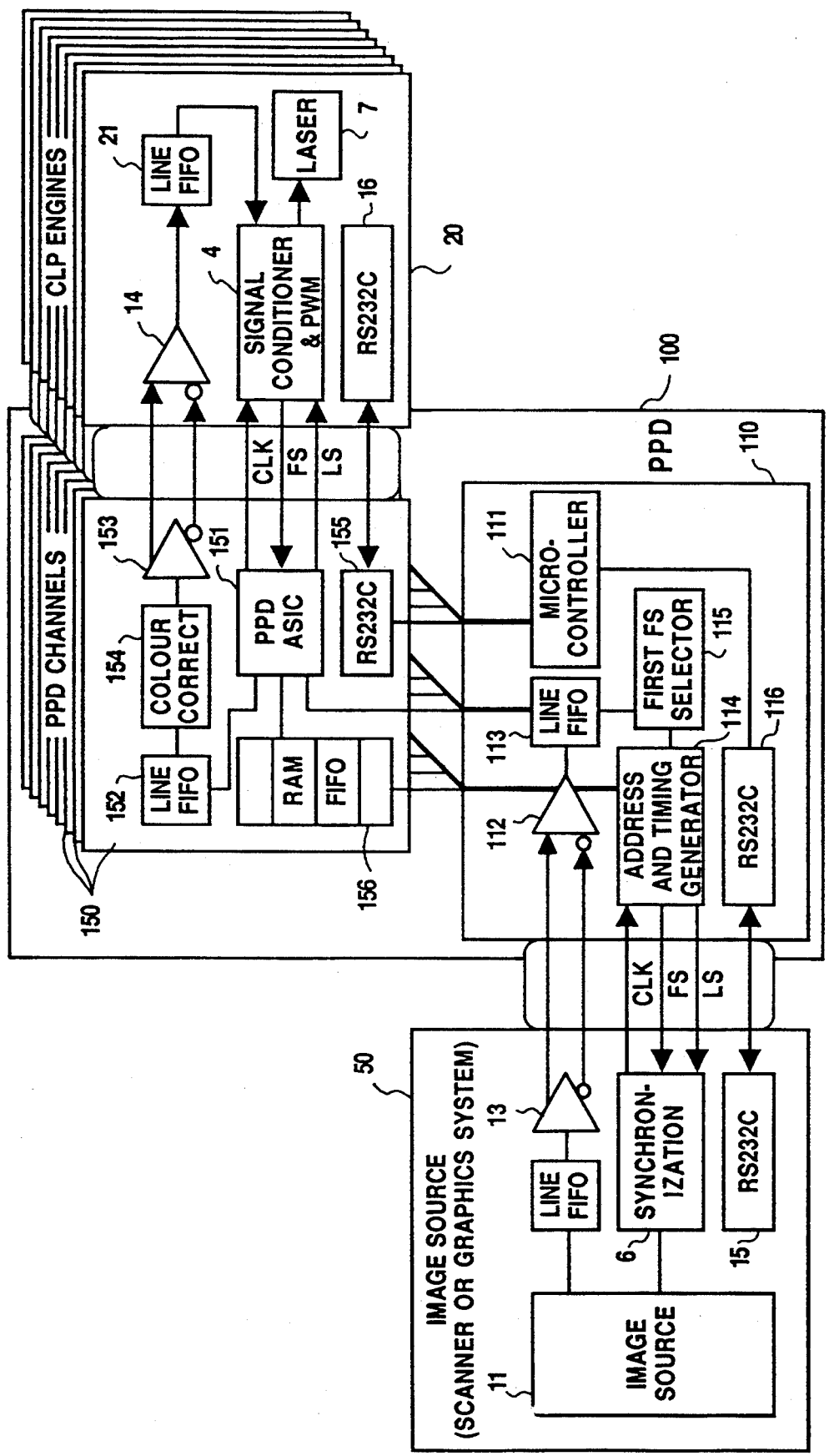
FIG. 8 illustrates a basic architecture of a printing system using PPD's.

With reference to FIG. 8, the PPD 100 includes a PPD input board 110 and a number, in this case eight, of PPD channel boards 150.

Communication of control instructions between the boards 110 and 150 is by way of RS232 units 116 and 155 respectively. A microcontroller 111, is interposed in the communication path and controls the operation of the PPD input board 110.

The PPD input board 110 also includes a balanced receiver 112 and a line FIFO 113 which perform corresponding functions to those devices used in the CLP engines 20. An address and timing generator 114 controls the flow of data from the image source 50 to the channel boards 150. A first FS (frame sync) selector 115 is provided to interrupt data output from the source 50 until the commencement of printing by the CLP engines 20. The receipt of the first frame sync pulse from one of the engines 20 defines the period t seen in FIG. 7. The PPD channel boards 150 have an ASIC (application specific integrated circuit) 151, a line FIFO 152, a colour correction circuit 154 and balanced transmitter 153. These emulate the connection of each CLP engine 20 to its "own" image source. A RAM FIFO 156 is also provided to buffer data from the input board 110. The size of the FIFO 156 is dependent upon the volume of data output from the source 50 during the period t.

Therefore, an important command for the CLP engines 20 is the one which causes the engines 20 to start printing. To minimise at and therefore the FIFO length, the RS232C commands to all of the CLP engines 20 connected are sent simultaneously. This is achieved by having the RS232C transceivers 155 appear twice in the address space of the microcontroller 111. The first address is for individually receiving messages from the CLP engines 20, and the second address of all RS232C ports is at the same address so that they can all be written simultaneously.

In order that a number of PPD's 100 can be cascaded to allow more than eight CLP engines to be connected, the delay between when the Start print message is received by the PPD 100 and when the eight Start printing messages are sent to the CLP engines 20, must not exceed the FIFO length (149 mS in this case).

Errors from the CLP engine 20, such as paper jam, out of toner, or out of paper, are received by the RS232C transceiver 16 on the PPD channel board 150 and re-transmitted back to the source 50. In order that the source 50 can determine which CLP engine 20 was the source of the error message, a route number is appended to the message indicating which RS232C channel received the message. Messages from cascaded PPD's 100 will have more than one of these route numbers. These messages can then be displayed on the scanner or graphics system, along with a number indicating the faulty CLP engine.

One potential problem with the parallel printing system is colour consistency amongst the CLP engines 20. The colour balance of the colour laser printing process varies with environmental conditions such as humidity. While this often goes without notice when all of the copies printed have the same colour balance, the parallel printing method will result in copies of the same image being printed on different CLP engines 20. When these copies are compared, colour differences are more noticeable.

This problem can be largely solved by including a colour correction map 54 in the PPD channel board 150 or in each CLP engine 20. The map 54 operates on the MCYK data by implementing a transfer function on the colour. A 1024×8 dual port SRAM is used so that independent transfer functions can be used for each of the MCYK passes. These colour correction maps are programmed by the source 50 by sending RS232C commands to the microcontroller 111 on the PPD input board 110. Any arbitrary transfer function can be programmed as the colour correction map is implemented in RAM. While this colour correction can be programmed manually by the user, it is preferable to include an automatic colour correction system as described herein.

There is no specific number of channels that a PPD system should be built with. As the PPD units can be cascaded, the number of channels in a single unit does not limit the total number of units which can be connected. PPD channel boards can be installed as required, so there is little cost disadvantage in allowing for relatively large numbers of channels in PPD. The arbitrary number which has been chosen for this example is eight channels per PPD.

As each PPD channel is identical, it is desirable to make each of them a separate board. This achieves the following benefits:

It allows PPD channels to be added as CLP engines 20 as added, thereby eliminating unnecessary costs;

It reduces development costs, as no large boards need be designed;

It increases manufacturing yields and reduces work-in-progress.

The connections to each PPD channel are also identical. This leads to a modular architecture, using small boards plugged into a backplane.

All of the hardware and software involved in the PPD 100 is straightforward with the exception of the RAM FIFO 156. Therefore, only this section of the PPD will be described in detail.

Figure 9:
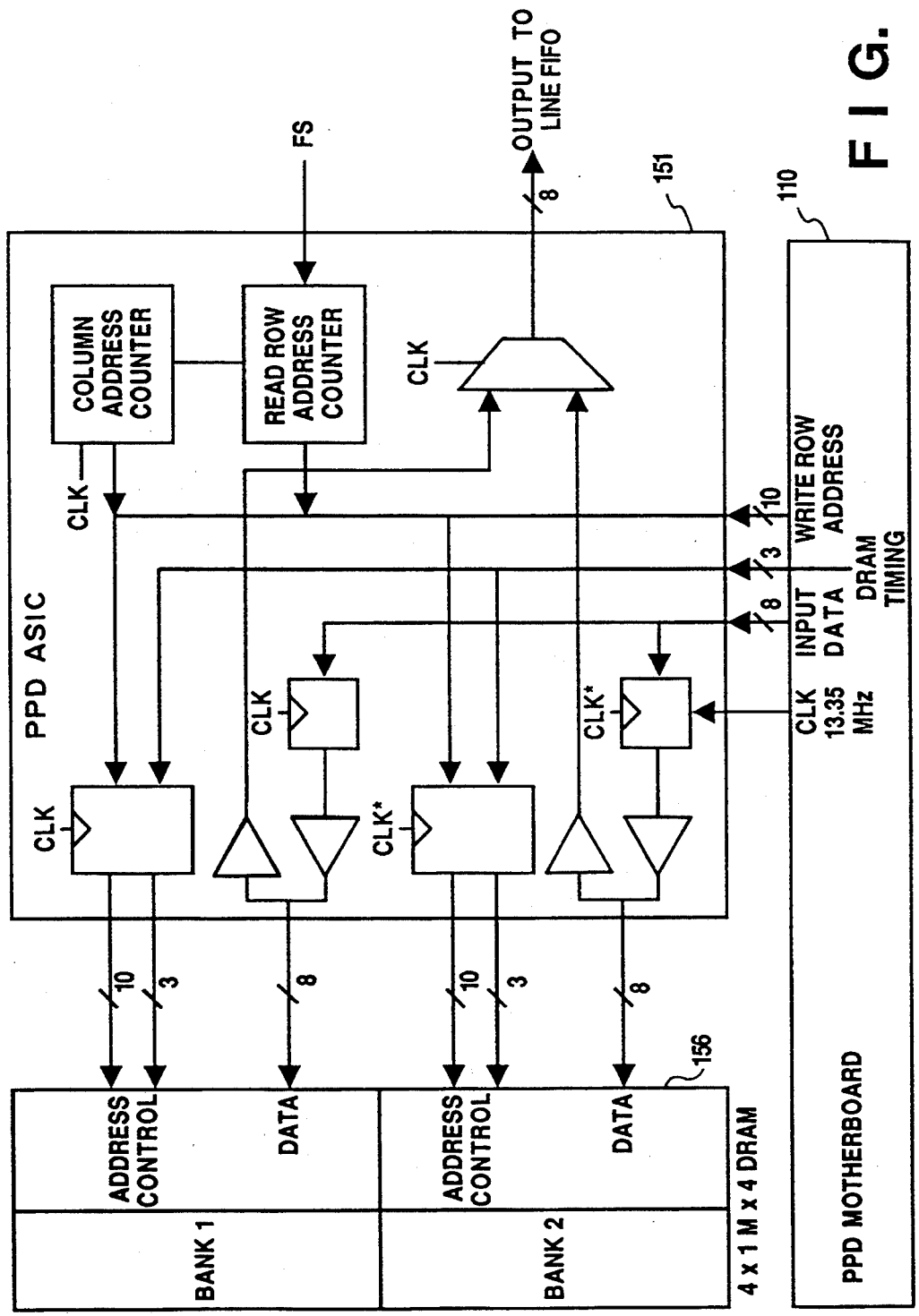
FIG. 9 shows in block diagram form the structure of the RAM FIFO in the PPD.

In relation to the RAM FIFO 156 and FIG. 9, an eight channel PPD 100 which compensates for $\Delta t$ up to 149 mS requires a total of 16 MBytes of FIFO memory. To reduce production costs it is preferable to implement this using the lowest cost semiconductor memory technology, which currently is DRAM.

The RAM FIFO 156 must have two ports: an input data port and an output data port. Each of these ports must operate at an average of 13.35 MBytes per second, giving a total average of 26.7 MBytes per second. This can be achieved using 4 MBit DRAMs in page mode or static column mode by interleaving accesses to two banks of DRAM, and by alternating between input and output on 2 KByte boundaries to maintain page mode operation. A line FIFO is used to convert the 2 KByte bursts of data at 26.7 MByte/sec into a continuous stream of 13.35 MByte/sec data.

Figure 10:
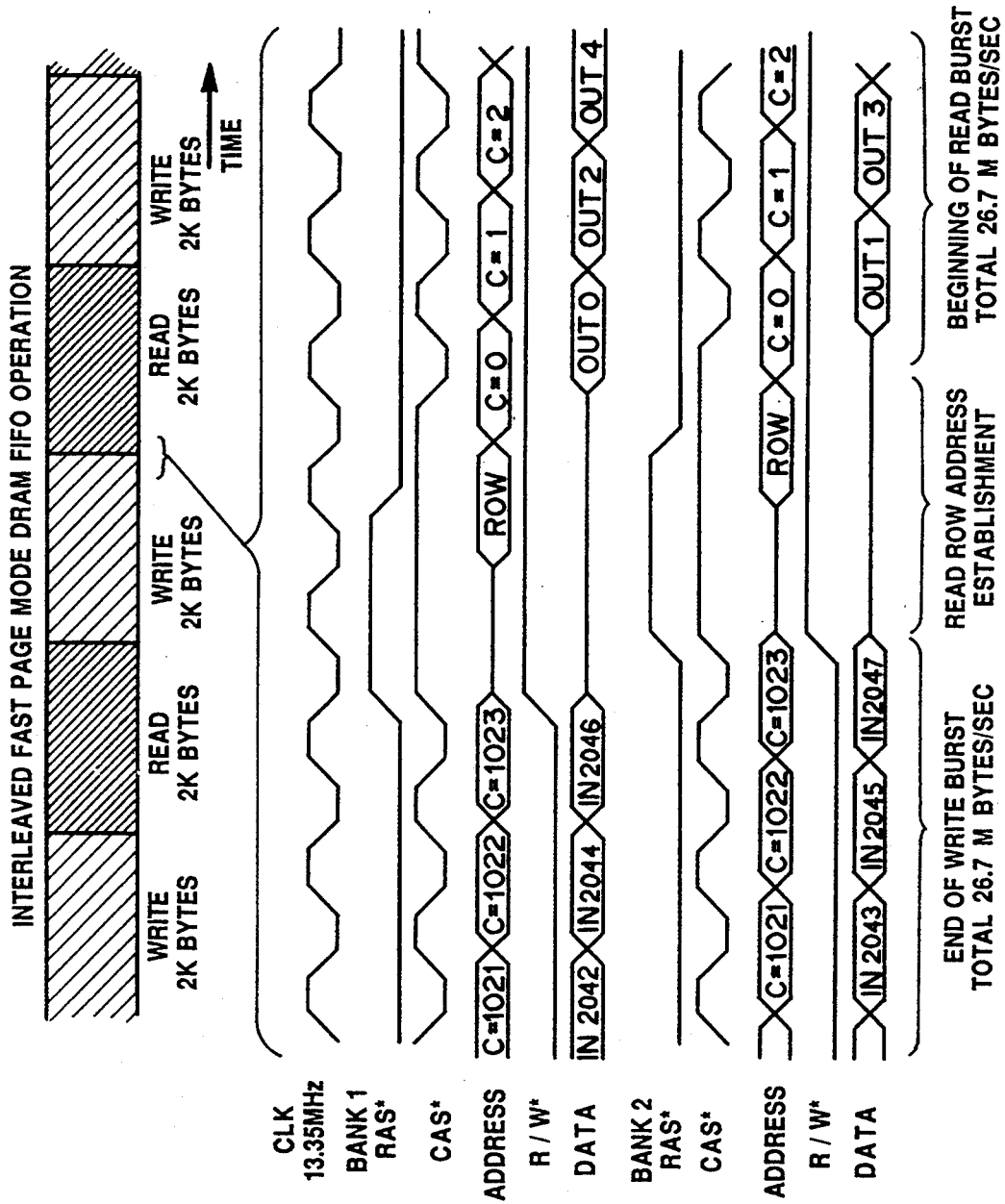
FIG. 10 is timing diagram for the RAM FIFO of FIG. 9.

So that low cost DRAM chips can be used, two banks of DRAM are interleaved, allowing a page mode cycle time of 74 nS. The RAM FIFO 156 is implemented using four 1M×4 fast page mode DRAMs and the ASIC 151 is preferably an Actel ACT1010 Fully Programmable Gate Array (FPGA). Timing signals for the RAM FIFO 156 are shown in FIG. 10. The timing and address signals for bank 2 are obtained by simply delaying Bank 1 timing and address signals by half a Clk period.

The colour balance of the CLP engines 20 can be automatically corrected by the following procedure:

Print a test pattern on each of the CLP engines which includes intensity scales of each of Magenta, Cyan, Yellow, and Black. These tests sheets include alignment marks.

The test sheets can include a bar code indicating the PPD 100 path to the CLP engine 20 the sheet was printed on. If this is then read by the scanner or graphics system, any error resulting from the user mixing up the test sheets can be avoided. This process requires printing different test sheets on each CLP engine 20. This can be achieved by generating the test sheets in turn and causing one CLP engine 20 to print at a time.

Place those test images on the scanner, and indicate which CLP engine it was printed on, The scanner or graphics system then analyses the colour regions printed on the CLP engine 20, and calculates four transfer functions which compensates for the colour intensities for each of MCYK.

Finally, these transfer functions are then sent to the microcontrollers on the PPD input boards, which write them to the appropriate colour correction map.

This colour correction process is performed whenever the difference in colour balance between the CLP engines becomes noticeable or is significant to the material being printed. However, where the CLP engines 20 are derived from the Canon Laser Copier, using eight channels, up to 40 A4 ppm can be printed. There are situations where print throughput requirements exceed 40 A4 ppm. This can easily be accommodated using the parallel printer method by cascading one or more PPD's 100.

It is possible to cascade PPD's 100 because the earliest Frame sync from any of the CLP engines 20 attached becomes the initial Frame sync of the whole system, even when the PPD's 100 are cascaded.

Figure 11:
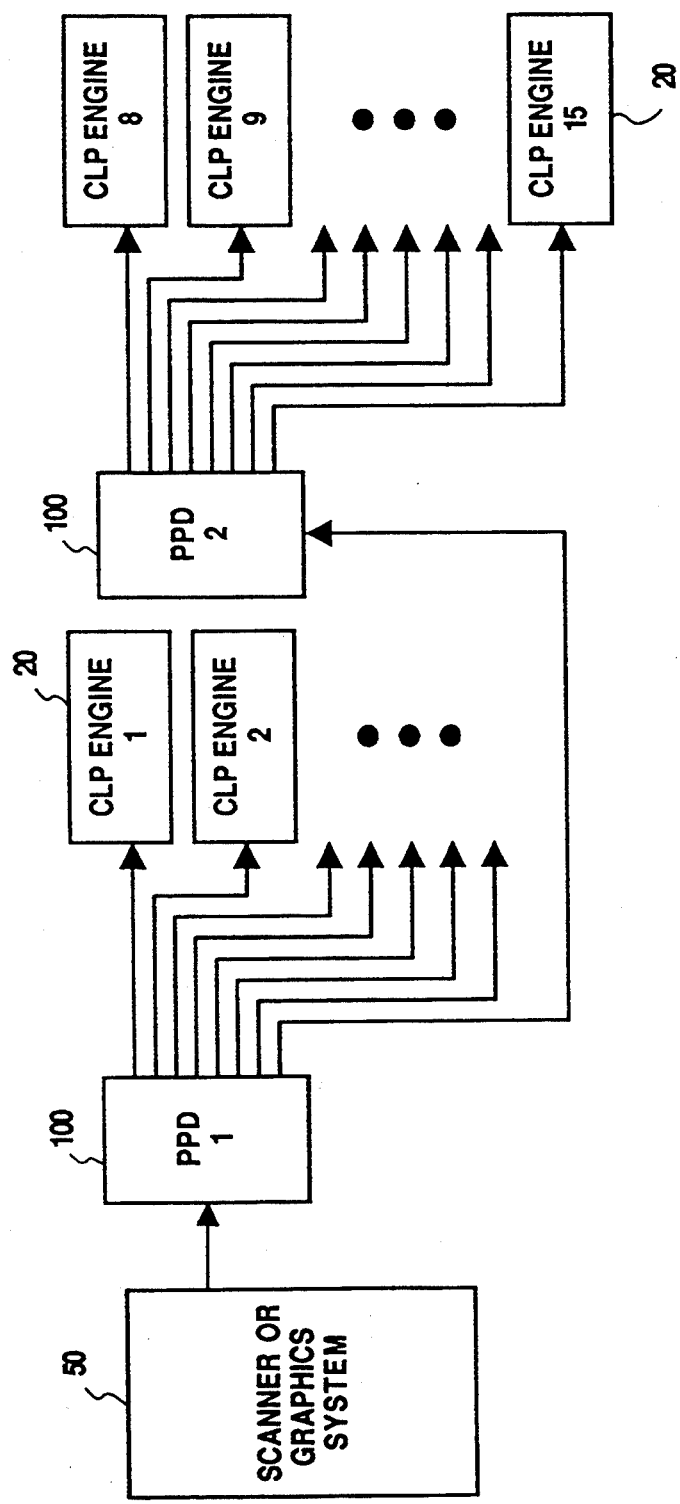
FIG. 11 shows an arrangement for the parallel printing of 15 pages.
Figure 12:
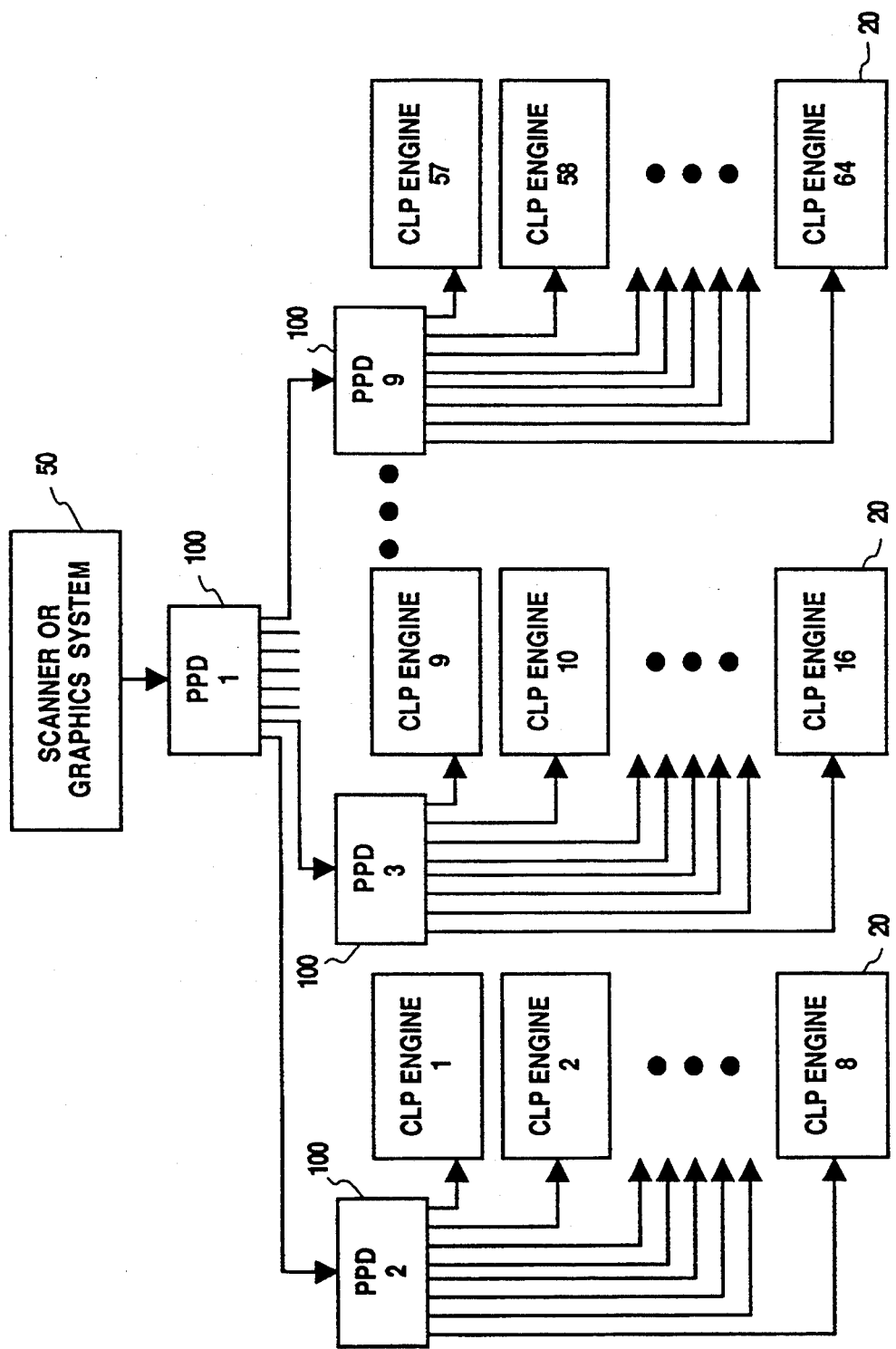
FIG. 12 shows an embodiment for the parallel printing of 64 pages.

The source 50 can detect when a PPD channel is connected to a cascade PPD 100 by interrogating the device using the RS232C port. Messages to or from cascaded CLP engines are reported through two levels of RS232C concentrator. The colour correction RAM of any PPD channels which are connected to cascade PPD's is programmed by the scanner or graphics system to have a "transparent" transfer function. Thus the colour correction of all CLP engines can be independently adjusted. Using two PPD's 100, up to fifteen CLP engines 20 can be connected, for print speeds of 75 A4 ppm as seen in FIG. 11. With nine PPD's up to 64 CLP engines can be connected as in FIG. 12. This will give print speeds up to 320 ppm, with a system cost around US$320,000. If more than 64 printers are required in any one installation, this can be achieved simply by cascading more PPD's. There is no limit to the number of PPD's that can be cascaded.

The following table is a brief comparison of the three methods described based on costs estimate in US% for 1993.

TABLE

| Method | 1<br>Fast<br>Printer | 2<br>Four Drum<br>Printer | 3<br>Parallel Printer |
|---|---|---|---|
| Print speed improvement | <2 | 4 | No limit |
| Maximum A4 ppm | 10 | 20 | No limit |
| Unit cost | >$60,000 | about $40,000 | $5,000/5 ppm |
| Cost per A4 ppm | $6,000 | $2,000 | $1,000 |
| System reliability | Low | Medium | Very high |
| MTBF | Poor | Good | Poor |
| Redundancy | Nil | Nil | # of parallel units |
| Compatibility | Very low | Medium | Fully compatible |
| Copier entry cost | >$100,000 | $60,000 | $10,000 |
| Upgrade increment | N/A | N/A | $5,000 |
| Sigle page print time | Fast | Slow | Slow |
| Development cost | Very high | High | Very low |

This table shows that the parallel printer method is advantageous in all respects except the MTBF and single page print time. However, the reduction in MTBF is more than offset by redundancy, achieving higher total system reliability.

As the cost per page of laser printed images falls, the use of large arrays of CLP engines has the potential of penetrating the existing colour printing market. Currently, the colour copy process is largely restricted to office use, desktop publishing or colour copy shops.

For example, if a customer requires 10,000 copies of a colour leaflet to be printed, colour photocopying is not currently viable. A single copier would take more than 33 hours to print 10,000 copies. While this is still less than the time normally taken to prepare colour separations and printing plates, the extra cost per page makes the cost of volume printing on a single CLP engine uneconomic.

However, if a large array of CLP engines is employed, the economics change. With an array of 64 CLP engines, print speeds up to 320 ppm are possible. 10,000 copies of a single page leaflet could be printed in 31 minutes. The total elapsed time, including collecting the 10,000 copies from the 64 printers (157 pages each) could easily be less than one hour.

Most full colour material is currently printed using a four colour offset printing process, which requires the production of colour separations and plates. The graph of FIG. 13 compares approximate cost versus quantity curves for offset and parallel printing methods.

Figure 13:
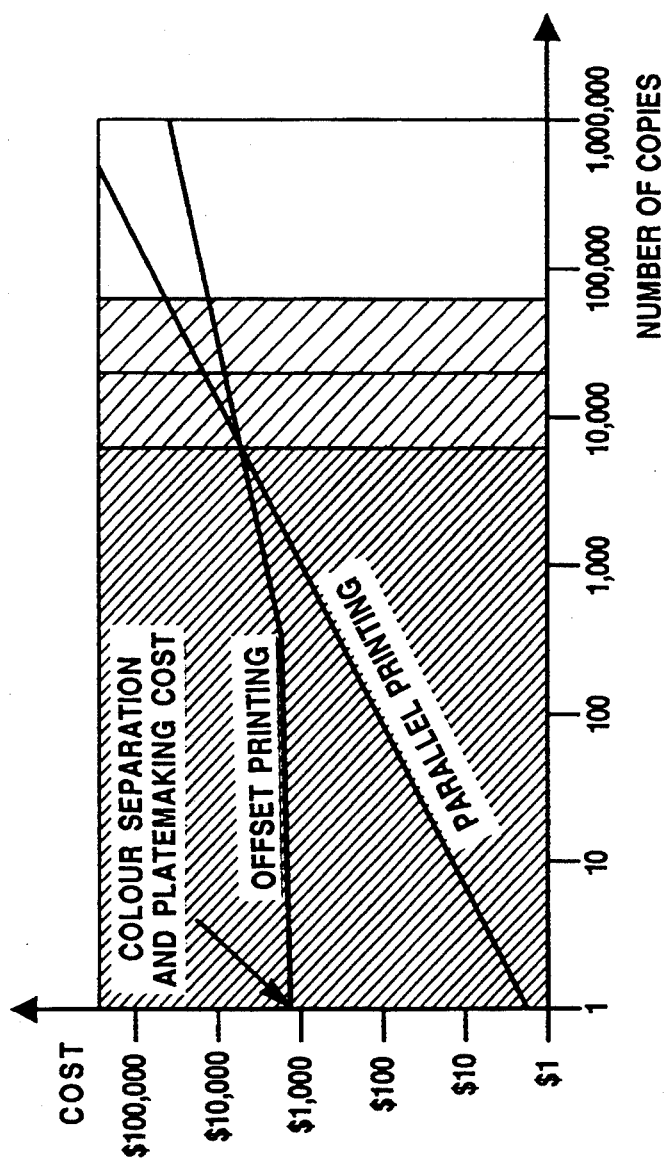
FIG. 13 is a graph of the comparative cost of printing utilising the present invention.

In FIG. 13 the largest, and most heavily hatched region is the print volume where parallel printing is lower cost than offset printing. The next region (medium hatch density) is the print volume where the extra cost of parallel printing will often be outweighed by convenience and time savings. The next region (lightest hatching) is the print volume where parallel printing may be used on time critical jobs. Finally, the unhatched region is the print volume where parallel printing is not viable.

The foregoing describes only a number of embodiments of the present invention and modifications, obvious to those skilled in the art can be made thereto without departing from the scope of the present invention.

What is claimed is:

1. A color printing system comprising:
   a source which outputs color video image data;
   a plurality of color print engines each of which forms a respective color image sequentially; and
   a parallel printing desynchronizer unit interconnecting said source and said engines, said desynchronizer unit comprising plural transfer means, one such transfer means corresponding to each said print engine, each said transfer means for transferring said data between said source and a corresponding print engine, said video data being synchronously simultaneously transferred to each of said transfer means;
   wherein the transfer to each of said engines from each corresponding transfer means is substantially independent of the transfer to any other of said engines, and the transfer of respective frames of color image data to each print engine from each corresponding transfer means is initiated upon receipt of a frame synchronizing signal from each respective print engine.

2. A printing system comprising:
   a source which outputs video image data;
   a plurality of print engines; and
   a parallel printing desynchronizer unit interconnecting said source and said engines, said desynchronizer unit comprising means for transferring said data between said source and each of said engines,
   wherein the transfer to each of said engines is substantially independent of the transfer to any other of said engines, and wherein said parallel printing desynchronizer unit interconnects said source with the plurality of said engines and a further parallel printing desynchronizer unit, said further parallel printing desynchronizer unit outputting to a further plurality of said engines.

3. A color printing system comprising:
   a source which outputs color video image data;
   a plurality of color print engines each of which forms a respective color image sequentially; and
   a parallel printing desynchronizer unit interconnecting said source and said engines, said desynchronizer unit comprising means for transferring said data between said source and each of said engines, wherein said parallel printing desynchronizer unit interconnects said source with a plurality of further parallel printing desynchronizer units, each said further unit interconnecting with a corresponding plurality of said engines; and wherein the transfer to each of said engines is substantially independent of the transfer to any other of said engines, and the transfer of respective color image data to each print engine is initiated upon receipt of a frame synchronizing signal from each respective print engine.

4. A parallel printing desynchronizer unit comprising:

a preliminary store to synchronously receive video image data from a video data source;

a plurality of first-in-first-out secondary stores each corresponding to a corresponding one of a like plurality of print engines connectable to said unit, said video data being synchronously simultaneously transferred to each of said secondary stores, each said secondary store having a trigger input and a data output both connected to the corresponding engines and arranged to transfer said data to said engine on receipt by said secondary store of a trigger signal from the corresponding engine; and a plurality of color correctors each corresponding to one of said print engines for adjusting the color balance of the output of the corresponding one of said print engines to provide for substantial uniformity in the color balance of the output of said engines.

5. A parallel printing desynchroniser unit as claimed in claim 4 wherein each said colour corrector includes a map of data adapted to constitute a transfer function on colour data output by said unit.

6. A parallel printing desynchroniser unit as claimed in claim 5 wherein said map is programmable either manually or by said source.

7. A color printing system comprising:

a source which outputs color video image data;

a plurality of color print engines each of which forms a respective color image sequentially; and a parallel printing desynchronizer unit interconnecting said source and said engines, said desynchronizer unit comprising means for transferring said data between said source and each of said engines, said means for transferring said data comprising:

a preliminary store to synchronously receive said video image data from said source;

a plurality of first-in-first-out secondary stores each corresponding to a corresponding one of said plurality of print engines connectable to said unit, said video data being synchronously simultaneously transferred to each of said secondary stores, each said secondary store having a trigger input and a data output both connected to the corresponding engines and arranged to transfer said data to the corresponding engine through said data output on receipt by said secondary store of a frame synchronizing signal at said trigger input from the corresponding engine; and a plurality of color correctors each corresponding to one of said plurality of print engines for adjusting the color balance of the output of the corresponding one of said print engines to provide for substantial uniformity in the color balance of the output of said engines;

wherein the transfer to each of said engines is substantially independent of the transfer to any other of said engines.

8. A printing system comprising:

a source of color video image data;

a plurality of color print engines;

providing means for providing frames of the color video image data to each of said color print engines, in parallel, upon receipt of a frame synchronizing signal from the respective print engine, said providing means comprising plural transfer means, one such means corresponding to each said print engine, each said transfer means for transferring said data between said source and a corresponding print engine, said video data being synchronously simultaneously transferred to each of said transfer means;

a plurality of color correctors each corresponding to one of said print engines for adjusting a color balance of an output of the corresponding one of said print engines to provide for substantial uniformity in the color balance of the output of said engines.

9. A printing system as claimed in claim 8, wherein said providing means comprises a printing desynchronizer unit allowing for the transfer of said data between said source and each of said engines without substantial synchronization between the operation of any of said engines.

10. A printing system as claimed in claim 8, wherein the source provides color data and the engines are color laser print engines so that said system is adapted to print color images.

11. A printing controller to provide color image data from a color image data source to a plurality of color print engines, comprising:

means for receiving color image data from the color image data source;

means for providing frames of the color image data to each of said color print engines in parallel, upon receipt of a frame synchronizing signal from the respective print engine, said means for providing including a plural transfer means, one such transfer means corresponding to each said print engine, each said transfer means for transferring the data between the source and a corresponding print engine, said video data being synchronously simultaneously transferred to each of said transfer means; and a plurality of color correctors each corresponding to one of said print engines for adjusting a color balance of an output of the corresponding one of said print engines to provide for substantial uniformity in the color balance of the output of said engines.

12. A printing controller as claimed in claim 11, wherein said providing means comprises a parallel printing desynchronizer unit allowing for the transfer of the data between said source and each said engine without substantial synchronization between the operation of any of said engines.

13. A printing controller as claimed in claim 11, wherein each said color corrector comprises a map of data adapted to constitute a transfer function on color data output by said unit.

14. A printing controller as claimed in claim 13, wherein said map is programmable manually.

15. A printing controller as claimed in claim 13, wherein said map is programmable by said source.

16. A printing controller to provide color image data from a color image data source to a plurality of color print engines, comprising:
- means for receiving color image data from said color image data source;
- means for providing the color image data to each of said color print engines in parallel; and
- a parallel printing desynchronizer unit interconnecting said source and said engines, said desynchronizer unit comprising plural transfer means, one such transfer means corresponding to each said print engine, each said transfer means for transferring said data between said source and a corresponding print engine, said video data being synchronously simultaneously transferred to each of said transfer means;
- wherein the transfer to each of said engines from each corresponding transfer means is substantially independent of the transfer to any other of said engines, and the transfer of respective frames of color image data to each of said print engines from each corresponding transfer means is initiated upon receipt of a frame synchronizing signal from each respective print engine.

17. A printing controller to provide color image data from a color data source to a plurality of color print engines, comprising:
- means for receiving color image data from said color image data source;
- means for providing the color image data to each of said color print engines in parallel; and
- a parallel printing desynchronizer unit interconnecting said source and said engines, said desynchronizer unit comprising means for transferring said data between said source and each of said engines,
- wherein the transfer to each of said engines is substantially independent of the transfer to any other of said engines, and wherein said parallel printing desynchronizer unit interconnects said source with the plurality of said engines and a further parallel printing desynchronizer unit, said further parallel printing desynchronizer unit outputting to a further plurality of said engines.

* * * * *